Nov. 13, 1951  F. W. FULLER  2,574,915
MOLDING TRAY
Filed July 24, 1948

Inventor
Frank W. Fuller
by W. Bartlett Jones
Attorney

Patented Nov. 13, 1951

2,574,915

UNITED STATES PATENT OFFICE 2,574,915

MOLDING TRAY

Frank W. Fuller, St. Paul, Minn., assignor to Rock Island Millwork Company, Rock Island, Ill., a corporation of Illinois Application July 24, 1948, Serial No. 40,514

13 Claims. (Cl. 18—34)

The present invention relates to the manufacture of hot-pressed boards, panels and the like, and in particular to apparatus involved.

In this field a moldable composition is integrated in a hot press to the desired form, commonly a flat panel. The mass to be molded is placed in a tray for entry into the press, wherein the bottom of the tray provides the mold-surface for one panel face. The present invention pertains to features of tray construction, and operations in combination with other elements.

It is an object of the invention to provide a tray with a movable portion for exposing the molded object therein to facilitate grasping and removing it.

A particular object of the invention is the provision of a tray having a removable end wall, and a partially removable bottom, to expose a molded panel to facilitate grasping it and removing it planewise of the panel.

It is a particular object to proide a tray with a thin flexible sheet metal bottom, loose at one end for dropping away from the molded product.

Another object of the invention is the provision of a tray in which a product is molded with an interlocking flange to prevent removal of the object facewise from the tray.

Various other and ancillary objects and advantages of the invention will become apparent from the following description and explanation of the invention as it is shown in the accompanying drawings with reference to the manufacture of a flat panel.

Figure 1:
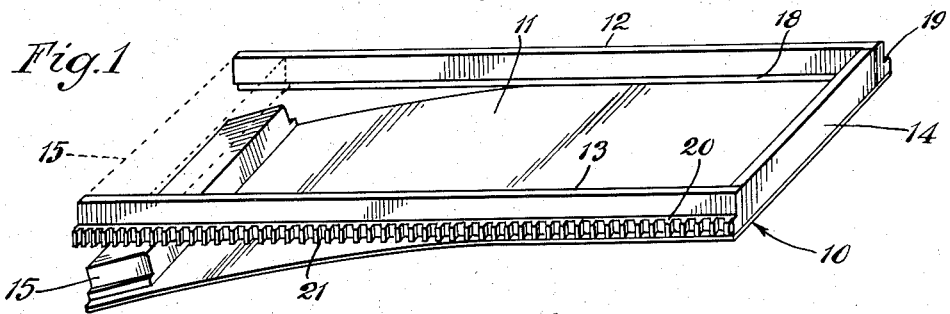
Fig. 1 is a perspective view of a suitable tray embodying the preferred features of construction in which a removable end wall is carried by a movable portion of the bottom which latter drops away from the normal position in a horizontal tray.

It is to be understood that the foregoing illustrations are merely exemplary of the presently preferred manner of carrying out the invention, and that the invention is not limited to and by the said exemplary illustrations, nor to and by the following discussion thereof which, for convenience, is directed to the formation of flat panels.

The invention is best explained by reference to the molding of a substantially dry mixture of wood sawdust and a suitable binder therefor, such as thermosetting resin, thoroughly distributed throughout the sawdust, as for example, by mixing with the sawdust a finely divided powdered resin-forming material, for which an appropriate phenol-formaldehyde condensation product is available. Such a moldable mixture may be heated and pressed to integrate it into a sort of synthetic lumber or molded object, particularly a flat panel. For example, such a moldable mixture is placed at a substantially uniform depth and density into a flat-bottom tray with retaining side walls for the mixture, and the tray is set on a hot platen of a suitable press. A companion heated punch platen moves onto the top of the tray contents to heat and compress it, thereby to integrate the mass to a form which conforms to the spaces between the tray bottom and the punch platen. Thus, the problem of removing the molded form, or panel, from the tray, is encountered, and this problem is enhanced when one or more side walls of the tray are undercut, as will be hereinafter described. Such undercutting is desirable, so that the formed product or panel will be retained in and by the tray as the punch platen is withdrawn, thereby to overcome any tendency of the molded body to follow the punch platen on withdrawal. According to the surface of the punch platen face and the character of the mass to be molded, there is a variable tendency for the board to stick to the face. For example, where there is present on the platen a wire screen, the tendency to stick is great. Also, where the punch platen has projecting side plates as illustrated, there is a tendency for molding around the edges thereof, when there are narrow clearance spaces adjacent the side plates.

In the tray of the present invention, such undercutting is purposely employed to retain the molded product in the tray, and additionally, means is provided to retain the tray against being lifted by the board in the event it should stick to the punch platen as it is withdrawn.

As illustrated in the drawings, the undercutting is employed in two opposite parallel side walls of the tray, whereby it becomes possible to withdraw the molded product planewise of the product upon suitable removal of an end wall of the tray. Mere removal of an end wall does not sufficiently expose the board to permit convenient engagement of it, involving contact with the molded bottom face thereof as by grasping the product to move it endwise from the tray. Where the product is to be pulled endwise from the tray, rather than pushed therefrom, as might be accomplished by moving the opposite end wall slidingly between the undercut side walls, a portion of the tray bottom is moved to expose the bottom of the board for grasping it for such withdrawal.

One way to meet these problems is illustrated in Fig. 1 wherein an exemplary rectangular tray 10 is shown in perspective, with a bottom 11 made of sheet metal, preferably iron or steel or other magnetic material, for a function later to be described. The tray has two parallel side walls 12 and 13 and two end walls 14 and 15, which four walls in normal relation constitute a rectangular frame to hold on the tray the charge to be molded therein. Walls 12, 13 and 14, as shown, are preferably rigidly related in the form of a U-shaped structure of which the end opening of the U is adapted to receive the end wall 15 between the side walls 12 and 13. The bottom 11 is secured to the end wall 14 and is preferably unsecured to the side walls 12 and 13, at least for a considerable distance away from the open end of the U-structure so that the bottom may drop away in part at least from the side walls 12 and 13, in a manner comparable to that illustrated. Preferably, the end wall 15 is secured to and carried by the dropping end of the bottom 11 in order that there is, in effect, but one moving part to open the tray.

One advantage of dropping the whole end of the tray bottom, rather than a limited part thereof, that is, a part only sufficiently for the purposes of grasping the board, and of doing so by a flexible bottom member, is that the mold surface against which the board is formed is thereby a continuous surface, not likely to leave any record in the molded surface of any seam or joint in the tray bottom.

Figure 4:
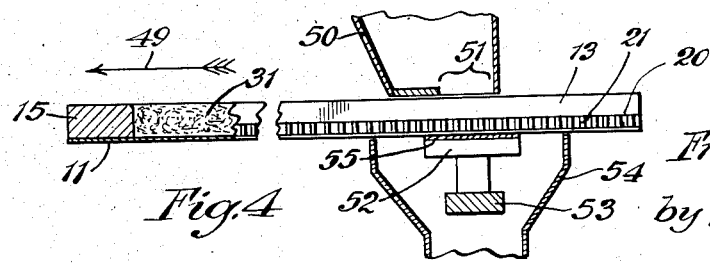
Fig. 4 is a more or less diagrammatic view showing the filling of a tray and the function therein of a magnetic tray bottom.

The greater "thickness" of the end wall 15 compared to the thickness of the end wall 14, results from use of the end wall 15 as a leading end in filling the tray with a charge from a hopper, as illustrated in Fig. 4, which hopper has mechanism related to the width at the top of the end wall 15. This mechanism is not pertinent to the present invention. However, it may be said that by reason of the relatively thicker end wall 15, its weight is thereby relatively greater, and this weight tends automatically to let gravity pull the bottom away from the molded board, when the position or supports for the tray permit the opening.

In Fig. 1, side walls 12 and 13 are undercut at 18 in a straight line groove about ⅛ inch deep, of which groove 18 in side wall 12 is visible. Also, these side walls 12 and 13 have lateral projections 19 and 20 forming corresponding shoulders on their outer vertical faces for co-action with guides or hold-down means which function in the pressing operation, as will be explained in connection with Fig. 2. For moving the tray, the lateral projections 19 and 20 have on their vertical outer faces rack teeth 21, which engage driving pinions (not shown).

Figure 2:
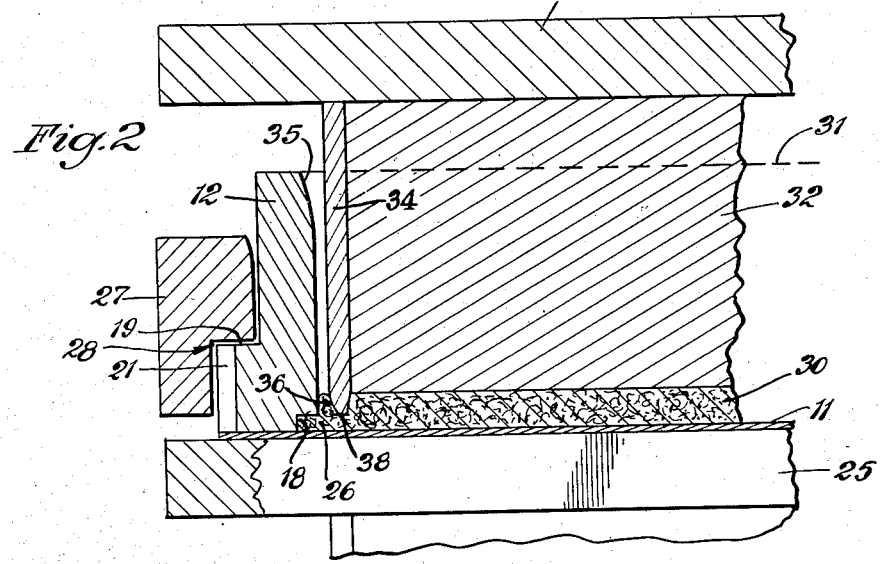
Fig. 2 is a view in vertical cross-section of a tray in a hot press: to illustrate the formation of a flange for interlocking the molded product to the tray, to illustrate a hold-down guide for the tray side walls, and to illustrate a particular construction of a punch platen in the press which aids in the formation of the interlocking flange.

Fig. 2 represents, in fragmentary view, a cross-section of the filled tray 10 as it contains a product under final compression in the hot press. Numeral 25 designates a platform platen of the press, which may be heated to a temperature in the range from 300° F. to 400° F., preferably 350° F. The filled tray is moved so that the bottom 11 rests on the platen 25. The side walls 12 and 13 of the tray are suitably retained against outward movement under lateral pressure, and at the same time they are positioned against vertical movement which might result through a tendency of the board to follow the upper platen as it is withdrawn. Accordingly, in the side wall 12, the groove 18 effects the formation of a thin flange 26 on the molded product. The outer face of the side wall 12 has its projecting shoulder 19 positioned against and under faces of a suitable guide and hold-down designated 27, which is recessed at 28 to receive the shoulder 19. Thus, the recess 28 provides vertical and horizontal positioning means for the side wall 12 of the tray. Corresponding parts function for opposite side wall 13.

Numeral 30 represents a compressed panel board of which the moldable mixture before compression was originally present in the tray to the level designated by dotted line 31 flush with the top edges of the tray side walls 12, 13, 14 and 15. For example, a tray 2″ deep is filled level to its top with the moldable mixture, and the mixture is ultimately compressed to a board ¼″ thick. The undercut grove 18 is such as to form a retaining flange 26 about ⅛″ thick.

Numeral 32 represents the upper press platen which, as a punch platen, moves onto the tray contents. It is preferably heated to the same temperature as the bottom platen 25. Platen 32 is carried by a foundation plate 33 which projects beyond the side walls of the punch platen 32, at least to a sufficient extent to provide a backing for side plates all around the vertical extent of the punch platen 32, as illustrated by one such side plate 34, which tapers downwardly on the inside for drawing. As illustrated, foundation 33 may be the bottom platen of an adjacent upper opening in a multi-opening press. The side plates 34 are such as to form a rectangular body of size to fill the tray 10 by entering alongside the four side walls of the tray, with a clearance of about ⅛ inch all around. This space tends to be filled with an ultimate vertical flange of irregular character. To facilitate clearance, the side walls may be slightly rounded from square form as indicated at 35 on tray side wall 12, and at 36 on the platen side plate 34. Plates 34 function to protect the inner punch platen 32 from wear and chipping, by use or accident, and for such purposes may be easily removed and replaced. Side plates 34 also function to provide anchoring and fastening means for any desired element which may be placed over the surface of the punch platen 32 for desired special effects on the molded product, for example, a wire screen. Additionally, the side plates 34 desirably project beyond the platen surface 32, thereby to form a dished platen area for the entire tray, which area thus constitutes a chamber to house or conserve steam which is created in the hot-pressing from any water or moisture in the mix, whether substantially dry or additionally wetted. The terminal edges 38 of the side plates 34 thus function to compress the charge under them to a greater density at the edges than at the center of the tray, and this greater compression forces additional material laterally into the recess 18 to form the retaining flange 26 for anchoring the molded sheet into the tray.

Figure 3:
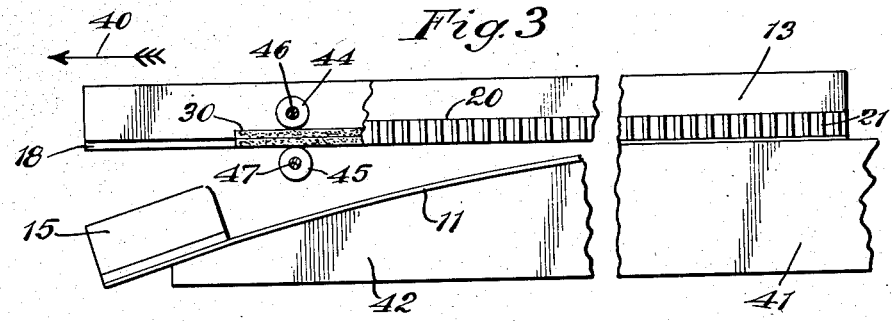
Fig. 3 is a more or less diagrammatic view showing operation of the tray to facilitate grasping and removing a panel board.

Fig. 3 shows the tray of Fig. 1 as it may appear after leaving the press in Fig. 2. The tray is shown as having moved generally in the direction of arrow 40 from the press to the position shown, on suitable tracks or guides 41 which support the tray bottom 11 in normal closed position. When it is desired to open the tray, suitable means operate for that purpose. Conveniently, this is accomplished by action of the weight of end wall 15, which on dropping carries the tray bottom 11 with it away from the molded panel 30. Dropping is permitted by tapering the supporting rails 41, as shown by the ends designated 42.

As the bottom 11 and end wall 15 drop together, the board 30 is exposed at both faces and may be grasped and pulled endwise from the tray. Mechanical grasping means are preferably employed, which resist the temperature of the hot board, and which do not damage the surfaces thereof. Rubber grip rolls are suitable, as indicated by rolls 44 and 45, respectively, mounted on shafts 46 and 47. The shafts 46 and 47 may be powered to cause the rolls to pull the board out of the tray planewise of the board, or they may merely exert gripping pressure through the rolls for bodily movement of the shafts in withdrawing the molded panel.

In using thin bottoms of metal for the tray 10, it tends to acquire a warped or irregular condition as a result of the constant heating, cooling, flexing, and handling thereof. It is important to fill the tray to a uniform depth corresponding to the height of the side walls. A warped tray bottom 11 makes the depth irregular when the filling is flush to the top edges of the side walls.

Means is employed to avoid the effect of a warped bottom in filling the tray. Fig. 4 shows part of a hopper 50, the bottom of which has a feeding area 51, capable of discharging fill material to a scrape-off level, as the tray moves along in the direction of arrow 49 under the hopper 50. This is preferably accomplished by means to raise portions of the bottom to normal tray level and simultaneously to draw portions of the tray down to normal level. When the tray bottom is magnetic, a horizontal magnetic support or grid functions for these purposes. A series of magnets provides a platform or grid at the normal tray level and substantially under the feeding zone 51 of the hopper 50, so that when the tray is filled the depth is normal. Magnetic means is illustrated in the form of a grid of spaced bar form permanent magnets 52 supported on cross bar 53. These are shown located within a collecting hopper 54 into which material from hopper 50 may fall when no tray properly receives it. On the magnets 52 is a suitably thin non-magnetic separator layer 55, to limit sliding friction of the tray over the magnets, yet to permit sufficient magnetic flux for the desired flattening of the bottom.

The apparatus of the present invention is not limited to the size and proportions shown, nor to the illustrated relations of the parts. Numerous changes and modifications of the structure are contemplated as falling within the scope of the appended claims.

I claim:

1. A tray in which to mold a body from a bulk mass fill in the tray, comprising in normal position a rectangular plane bottom of flexible sheet material, parallel side walls, and two end walls joining said side walls, said walls together forming a frame around and above said bottom, said bottom at one end of the tray being unsecured to said walls so as to flex away from said walls and being elsewhere secured in normal fixed relation to said side walls, at least one of said end walls being carried by said flexing end of the bottom, whereby movement of said end wall out of normal position exposes an end of said molded body, whereby to facilitate grasping said molded body for removal from the tray.

2. A tray in which to mold a body from a bulk mass fill in the tray, comprising in normal position a rectangular plane bottom of flexible sheet material, parallel side walls, and two end walls joining said side walls, said walls together forming a frame around and above said bottom, said side walls being undercut from the interior of the tray along their entire length to form parallel molded flanges on said body, said bottom at one end of the tray being unsecured to said walls so as to flex away from said walls and being elsewhere secured in normal fixed relation to said side walls, at least one of said end walls being carried by said flexing end of the bottom, whereby movement of said end wall out of normal position exposes an end of said molded body, whereby to facilitate grasping said molded body for removal from the tray by sliding said flanges in said undercut side walls.

3. A tray in which to mold a body from a bulk mass fill in the tray, comprising in normal position a rectangular plane bottom of flexible magnetic sheet material, parallel side walls, and two end walls joining said side walls, said walls together forming a frame around and above said bottom, said bottom at one end of the tray being unsecured to said walls so as to flex away from said walls and being elsewhere secured in normal fixed relation to said side walls, at least one of said end walls being carried by said flexing end of the bottom, whereby movement of said end wall out of normal position exposes an end of said molded body, whereby to facilitate grasping said molded body for removal from the tray.

4. A tray in which to mold a body from a bulk mass fill in the tray, comprising in normal position a rectangular plane bottom of flexible magnetic sheet material, parallel side walls, and two end walls joining said side walls, said walls together forming a frame around and above said bottom, said side walls being undercut from the interior of the tray along their entire length to form parallel molded flanges on said body, said bottom at one end of the tray being unsecured to said walls so as to flex away from said walls and being elsewhere secured in normal fixed relation to said side walls, at least one of said end walls being carried by said flexing end of the bottom, whereby movement of said end wall out of normal position exposes an end of said molded body, whereby to facilitate grasping said molded body for removal from the tray.

5. A tray in which to mold a body from a bulk mass fill in the tray, comprising in normal position a plane bottom of flexible sheet material, two side walls, and two end walls joining said side walls, said walls together forming a frame around and above said bottom, said side walls and one end wall forming a generally U-shaped pocket from which an interposed rigid mass may be withdrawn along the plane bottom, said bottom at the U-opening being unsecured to the adjacent end portions of said side walls so as to flex away from said side walls and being elsewhere secured in normal fixed relation to said side walls, at least the end wall at the U-opening being removable from normal position, whereby movements of said end wall and said bottom out of normal positions expose an end of said molded body, whereby to facilitate grasping said molded body for removal from the tray.

6. A tray in which to mold a body from a bulk mass fill in the tray, comprising in normal position a bottom of flexible sheet material, two side walls, and two end walls joining said side walls, said walls together forming a frame around and above said bottom, said side walls and one end wall forming a generally U-shaped pocket from which an interposed rigid mass may be withdrawn generally in an endwise direction, said bottom at the U-opening being unsecured to the adjacent end portions of said side walls so as to flex away from said side walls and being elsewhere secured in normal fixed relation to said side walls, at least the end wall at the U-opening being removable from normal position, whereby movements of said end wall and said bottom out of normal positions expose an end of said molded body, whereby to facilitate grasping said molded body for removal from the tray.

7. A tray in which to mold a body from a bulk mass fill in the tray, comprising in normal position a bottom having an end portion movable downwardly from normal position relative to a remaining portion in normal bottom position, two side walls, and two end walls joining said side walls, said walls together forming a frame around and above said bottom, said side walls and one end wall forming a generally U-shaped pocket from which an interposed rigid mass molded in the tray may be withdrawn, said movable portion of the bottom at the U-opening being unsecured to the adjacent end portions of said side walls so as to move away from said side walls and being elsewhere secured in normal fixed relation to said side walls, at least the end wall at the U-opening being removable from normal position whereby movements of said end wall and said bottom portion out of normal positions expose an end of said molded body, whereby to facilitate grasping said molded body for removal from the tray.

8. A tray in which to mold a body from a bulk mass fill in the tray, comprising in normal position a plane bottom of flexible sheet material, walls together forming a frame around and above said bottom, at least one portion of the frame being removable with respect to a remaining portion which latter forms an area from which interposed molded material on the bottom may be withdrawn slidingly on the bottom, the walls forming said area being undercut, said bottom at an area along one edge of the tray and at a removable frame portion being unsecured to said walls so as to flex away from said walls and being elsewhere secured in normal fixed relation to walls, whereby removal of the removable frame portion out of normal position and flexing of the bottom expose an edge and the bottom of said molded body, whereby to facilitate grasping said molded body for removal from the tray.

9. A tray in which to mold a body from a bulk mass fill in the tray, comprising in normal position a bottom having a portion movable from normal position with respect to the remainder in normal position, walls together forming a frame around and above said bottom, one portion of the frame being removable with respect to a remaining portion which latter forms an area from which interposed molded material on the bottom may be withdrawn slidingly on the bottom, the walls forming said area being undercut, said bottom at an area along one edge of the tray and at a removable frame portion being unsecured to said walls so as to move away from said walls and being elsewhere secured in normal fixed relation to walls, whereby removal of the removable frame portion out of normal position and movement of the movable portion of the bottom expose an edge and the bottom of said molded body, whereby to facilitate grasping said molded body for removal from the tray.

10. A tray in which to mold a body from a bulk mass fill therein comprising in molding position a plane bottom of flexible sheet material, two end walls and two side walls together forming a rectangular retaining frame for said fill over said bottom, one end portion of the bottom being unsecured to the adjacent portions of the side walls and being movable downwardly away from said portions in flexing of the bottom along a flexing line therein extending between said side walls, a portion at least of the bottom extending from said flexing line in the direction toward the other end of said bottom being secured to said side walls.

11. A tray in which to mold a body from a bulk mass fill therein comprising in molding position a plane bottom of flexible sheet material, two end walls and two side walls together forming a rectangular retaining frame for said fill over said bottom, one end portion of the bottom being unsecured to the adjacent portions of the side walls and being movable downwardly away from said portions in flexing of the bottom along a flexing line therein extending between said side walls, the remaining portion of the bottom extending from said flexing line in the direction toward the other end of said bottom being secured to said side walls and the corresponding end wall.

12. A tray in which to mold a body from a bulk mass fill therein comprising in molding position a plane bottom of flexible sheet material, two end walls and two side walls together forming a rectangular retaining frame for said fill over said bottom, one end wall being secured to the corresponding end portion of the bottom and being unsecured to the adjacent side walls, the said corresponding end portion of the bottom being unsecured to the adjacent portions of the side walls and being movable downwardly away from said portions in flexing of the bottom along a flexing line therein extending between said side walls, a portion at least of the bottom extending from said flexing line in the direction toward the other end of said bottom being secured to said side walls.

13. A tray in which to mold a body from a bulk mass fill therein comprising in molding position a plane bottom of flexible sheet material, two end walls and two side walls together forming a rectangular retaining frame for said fill over said bottom, one end wall being secured to the corresponding end portion of the bottom and being unsecured to the adjacent side walls, the said corresponding end portion of the bottom being unsecured to the adjacent portions of the side walls and being movable downwardly away from said portions in flexing of the bottom along a flexing line therein extending between said side walls, the remaining portion of the bottom extending from said flexing line in the direction toward the other end of said bottom being secured to said side walls.

FRANK W. FULLER.

REFERENCES CITED

The following references are of record in the file of this patent:

UNITED STATES PATENTS

| Number | Name | Date |
|---|---|---|
| 1,116,669 | Birdsey et al. | Nov. 10, 1914 |
| 1,140,840 | Moore | May 25, 1915 |
| 1,731,240 | Apfelbaum | Oct. 15, 1929 |
| 2,269,557 | Sexton | Jan. 13, 1942 |